2,744,898

HALOGEN SUBSTITUTED ALKENYL DITHIOCARBAMATES

Marion W. Harman, Nitro, and John J. D'Amico, Charleston, W. Va., assignors to Monsanto Chemical Company, St. Louis, Mo., a corporation of Delaware No Drawing. Application March 17, 1952,
Serial No. 277,057

19 Claims. (Cl. 260—247.1)

The present invention relates to halogen substituted alkenyl esters of dithiocarbamic acids. By an alkenyl group is meant an open chain unsaturated radical having one double bond and at least one halogen substituent, which is preferably chlorine although other halogens may be used. The invention also relates to the preparation of these compounds.

The new compounds may be represented by the probable structure R—S—R' where R is a thiocarbamyl group and R' is a halogen substituted alkenyl group. Examples of alkenyl groups include vinyl, allyl, propenyl, isopropenyl, butenyl and pentenyl groups substituted by one or more chlorine or bromine atoms. Of this class of compounds a preferred group contain the nucleus

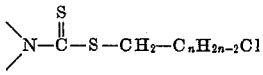

where $n$ is an integer greater than one but less than four.

The compounds of this invention may be prepared by condensing an alkali metal salt of a dithiocarbamic acid with a poly halo olefin under such conditions that part only of the halogen is removed so that an ester containing a halo alkene substituent is produced. The reactions can be effected conveniently by condensing the dithiocarbamate in the form of a water soluble salt in aqueous solution with the poly halo olefin. Thus, the method is applicable to dithiocarbamates which form water soluble sodium salts. Suitable substituted olefins include cis-1,2,3-trichloro-2-butene, trans-1,2,3-trichloro-2-butene, 1,3-dichloro-2-butene, 2,3-dichloro-2-propene, 1,3-dichloro-1-propene, cis-1,2,3-trichloro-1-propene, trans-1,2,3,-tricholor-1-propene, and 2,3,3-trichloro-1-butene. The last readily undergoes an allylic rearrangement and is therefore equivalent to 1,2,3-trichloro-2-butene. Examples of the new compounds are represented by the 4-chloro-2-butenyl, 3-chloro-2-butenyl, 2-chloro allyl, 3-chloro allyl and 2,3-dichloro-2-butenyl esters of the following dithiocarbamic acids: dimethyl-, dibutyl-, diethyl-, dipropyl-, diamyl-, dihexyl- and dioctyl dithiocarbamic acids, N-methyl cyclohexyl-, N-ethyl cyclohexyl-, N-cyanoethyl N-ethyl-, N-cyanoethyl N-proyl-, N-cyanoethyl N-butyl-, N-cyanoethyl N-amyl- and N-cyanoethyl N-octyl dithiocarbamic acids, dicyanoethyl dithiocarbamic acid, piperazine dicarbodithioic acid, 4-morpholine carbodithioic acid, piperidine carbodithioic acid, pyrrolidine carbodithioic acid, N-methyl N-tetrahydrofurfuryl dithiocarbamic acid, ethylene bis carbodithioic acid, dithiocarbamic acid and diallyl dithiocarbamic acid.

The following examples illustrate in detail the preparation and properties of some of the new products but are not to be taken as limitative.

EXAMPLE 1

125 grams (1 molecular proportion) of 1,3-dichloro-2-butene was added with stirring to 840 grams (1 molecular proportion) of a 17% solution of sodium dimethyldithiocarbamate containing a few drops of a 30% solution of a surface active agent (dodecylbenzene sodium sulfonate). Within 20 minutes a temperature rise from 30 to 46° C. was noted. The mixture was heated at 50–60° C. for 4 hours. After cooling to room temperature the layers were separated, the organic layer washed with warm water until the wash water was neutral to litmus, dried over sodium sulfate, and finally any unreacted 1,3-dichloro-2-butene was removed in vacuo at room temperature. 183 parts by weight, M. P. 27–28° C., was obtained. The product could not be distilled at 1 mm. without the composition. The analysis confirmed this compound to be 3-chloro-2-butenyl-dimethyldithiocarbamate.

EXAMPLE 2

In the foregoing procedure 55 grams (0.5 molecular proportion) of 2,3-dichloro-1-propene was substituted for the 1,3-dichloro-2-butene and one-half the quantity of sodium dimethyldithiocarbamate used or 420 grams (0.5 molecular proportion) of a 17% solution. An exothermic reaction resulted in a temperature rise from 30 to 39° C. within 20 minutes. 86 parts by weight, M. P. 35–37° C., was obtained. Analysis confirmed that the solid obtained was 2-chloro allyl dimethyldithiocarbamate.

EXAMPLE 3

In the procedure of Example 1, 710 grams (1 molecular proportion) of a 15.5% aqueous solution of ammonium dithiocarbamate was substituted for the solution of sodium dimethyldithiocarbamate. An exothermic reaction resulted in the temperature rising from 25 to 38° C. within 5 minutes. There was no external heating. The mixture was stirred for about 4 hours and the product isolated as described. 150 parts by weight, M. P. 25–27° C., was obtained. Analysis confirmed that the product was the desired 3-chloro-2-butenyl dithiocarbamate.

EXAMPLE 4

In the procedure of Example 1, 111 grams (1 molecular proportion) of 2,3-dichloro-1-propene was substituted for the 1,3-dichloro-2-butene and 745 grams (1 molecular proportion of a 23% solution of sodium diethyldithiocarbamate was substituted for the solution of sodium dimethyldithiocarbamate. The reaction was exothermic, the temperature rising from 29 to 46° C. over a period of about 20 minutes. 199 parts by weight was obtained. The liquid product isolated as described in Example 1 was confirmed by analysis to be the desired 2-chloro allyl diethyldithiocarbamate.

EXAMPLE 5

In the procedure of Example 1, 745 grams (1 molecular proportion) of a 23% aqueous solution of sodium diethyldithiocarbamate was substituted for the sodium dimethyldithiocarbamate. An exothermic reaction set in causing the temperature to rise from 29 to 51° C. within 15 minutes. The liquid product was isolated as described. 200 parts by weight was obtained. Analysis confirmed that it was the desired 3-chloro-2-butenyl diethyldithiocarbamate.

EXAMPLE 6

In the procedure of Example 1, 111 grams (1 molecular proportion) of 1,3-dichloro-1-propene was substituted for the 1,3-dichloro-2-butene and 745 grams (1 molecular proportion) of a 23% solution of sodium diethyldithiocarbamate substituted for the sodium dimethyldithiocarbamate solution. The exothermic reaction resulted in the temperature rising from 29 to 49° C. within 20 minutes. The liquid product was isolated as described. 190 parts by weight was obtained. Analysis confirmed that it was the expected 3-chloro allyl diethyldithiocarbamate. It decomposed when attempt was made to distill it at 1 mm.

EXAMPLE 7

In the procedure of Example 1, 111 grams (1 molecular proportion) of 1,3-dichloro-1-propene was substituted for the 1,3-dichloro-2-butene and 755 grams (1 molecular proportion) of a 19% solution of sodium dimethyldithiocarbamate was used instead of 840 grams of a 17% solution. The exothermic reaction caused the temperature to rise from 29 to 45° C. in about 10 minutes. The reaction was completed and the product isolated as described. 185 parts by weight was obtained. Analysis confirmed that the liquid product was the desired 3-chloro allyl dimethyldithiocarbamate. It decomposed when attempt was made to distill it at 1 mm.

The analyses of the foregoing products together with the yields obtained and physical properties of the products are summarized in the table below:

*Table I*

| Example No. | Empirical Formula | Analysis | | M. P. or B. P. | Yield, Percent |
|---|---|---|---|---|---|
| | | Calcd. | Found | | |
| 1 | $C_7H_{12}ClNS_2$ | N 6.68<br>S 30.57<br>Cl 16.90 | 6.90<br>30.60<br>17.00 | 27–28° C | 87.5 |
| 2 | $C_6H_{10}ClNS_2$ | N 7.16<br>S 32.76<br>Cl 18.11 | 7.34<br>32.80<br>18.07 | 35–37° C<br>126–128° C./1 mm | 88.1 |
| 3 | $C_5H_8ClNS_2$ | N 7.71<br>Cl 19.51 | 7.97<br>20.3 | 25–27° C | 83.0 |
| 4 | $C_8H_{14}ClNS_2$ | N 6.26<br>S 28.65 | 6.18<br>28.57 | 128–130° C./1 mm | 89.0 |
| 5 | $C_9H_{16}NClS_2$ | N 5.89<br>S 26.96 | 5.82<br>26.86 | 158–161° C./2 mm | 84.4 |
| 6 | $C_8H_{14}ClNS_2$ | N 6.26 | 6.22 | oil | 85.0 |
| 7 | $C_6H_{10}ClNS_2$ | N 7.16 | 7.04 | do | 94.5 |

EXAMPLE 8

To 454 grams of a 27.2% solution of the sodium salt of 4-morpholinecarbodithioic acid there was added with stirring 83.5 grams (0.666 molecular proportion) of 1,3-dichloro-2-butene. Within 20 minutes a temperature rise from 22 to 27° C. was noted. The mixture was stirred for 6 hours, the white solid was recovered by filtration, and washed with water until the wash water was neutral to litmus. 160 parts by weight was obtained, M. P. 56–57° C. The analysis indicated this compound to be 3-chloro-2-butenyl-4-morpholinecarbodithioate.

EXAMPLE 9

In the procedure of Example 8, 73.8 grams (0.666 molecular proportion) of 2,3-dichloro-1-propene was substituted for the 1,3-dichloro-2-butene. The exothermic reaction caused the temperature to rise from 23 to 38° C. within 55 minutes. The reaction mixture was then stirred and the product isolated as described. 140 parts by weight, M. P. 73–74° C., was obtained. Analysis confirmed that the solid product was 2-chloro allyl-4-morpholinecarbodithioate.

EXAMPLE 10

To 447 grams of a 27.2% solution of the sodium salt of 4-morpholinecarbodithioic acid there was added with stirring 72.2 grams (0.65 molecular proportion) of 1,3-dichloro-1-propene. Within 5 minutes a temperature rise from 25 to 47° C. was noted. The mixture was stirred for 6 hours, layers were separated, and the organic layer dissolved in 500 ml. of ethyl ether. The ether layer was washed with water until the wash water was neutral to litmus, dried over sodium sulfate, and finally the ether removed in vacuo. 141 grams of an amber oil, M. P. −10° C., was obtained. The analysis indicated this compound to be 3-chloro allyl-4-morpholinecarbodithioate.

The analyses of the foregoing products together with the yields obtained and physical properties of the products are summarized in the table below:

*Table II*

| Example No. | Empirical Formula | Analysis | | M. P., ° C. | Yield, Percent |
|---|---|---|---|---|---|
| | | Calcd. | Found | | |
| 8 | $C_9H_{14}ClNOS_2$ | N 5.56<br>S 25.46<br>Cl 14.08 | 5.92<br>25.56<br>13.75 | 56–57 | 95.5 |
| 9 | $C_8H_{12}ClNOS_2$ | N 5.89<br>S 26.97 | 6.38<br>26.90 | 73–74 | 95.0 |
| 10 | $C_8H_{12}ClNOS_2$ | N 5.89<br>S 26.97<br>Cl 14.91 | 5.91<br>27.22<br>15.20 | −10 | 91.8 |

EXAMPLE 11

To 847 grams of a 16.6% solution of sodium diallyl dithiocarbamate there was added gradually with stirring 77.5 grams (0.70 molecular proportion) of 2,3-dichloro-1-propene. An exothermic reaction set in, the temperature rising from 20 to 28° C. within 1 hour. The reaction mixture was stirred for 6 hours and the organic layer separated. The amber oily organic layer was dissolved in 500 ml. of ethyl ether, washed with water until the wash water was neutral to litmus and the solvent removed by distillation. The residue was dried over anhydrous sodium sulfate. 145 grams of an amber oily product was obtained. It boiled at 145–146° C./1 mm. Analysis confirmed that the product was the expected 2-chloro allyl diallyldithiocarbamate.

EXAMPLE 12

In the procedure of Example 11, 87.5 grams (0.70 molecular proportion) of 1,3-dichloro-2-butene was substituted for the 2,3-dichloro-1-propene. The exothermic reaction caused the temperature to rise from 25 to 38° C. within about 30 minutes. The mixture was then stirred and the product isolated substantially as described. 174 parts by weight of an amber oily product was obtained which could not be distilled at 1 mm. without decomposition. The analysis confirmed that the liquid product obtained was the desired 3-chloro-2-butenyl diallyldithiocarbamate.

EXAMPLE 13

To 614 grams of a 15.2% solution of disodium 2,5-dimethyl-1,4-piperazinedicarbodithioate, there was added 66.6 grams (0.6 molecular proportion) of 2,3-dichloro-1-propene. An exothermic reaction set in, the temperature rising from 25 to 31° C. within 1 hour. The reaction mixture was stirred for 6 hours and the light yellow solids were filtered off, washed with water until the wash water was neutral to litmus, and finally dried in a 50° C. oven. 121 grams of a light yellow solid was obtained.

It possessed a melting point of 123–124° C., which after crystallization from ethyl alcohol melted at 124–125° C. Analysis confirmed that the product was the expected bis(2-chloroallyl)-2,5-dimethyl-1,4-piperazinedicarbodithioate.

EXAMPLE 14

In the procedure of Example 13, 75 grams (0.6 molecular proportion) of 1,3-dichloro-2-butene was substituted for the 2,3-dichloro-1-propene. The exothermic reaction caused the temperature to rise from 20 to 35° C. within 20 minutes. The reaction mixture was then stirred and the product isolated all substantially as described in the foregoing example. 126 grams of a light yellow solid, M. P. 99–101° C., was obtained. After crystallization from ethyl alcohol, it melted at 102–103° C. Analysis confirmed that the product was the expected bis(3-chloro-2-butenyl)-2,5-dimethyl-1,4-piperazinecarbodithioate.

The analysis of the foregoing products together with the yields obtained and physical properties of the products are summarized in the table below:

Table III

| Example No. | Empirical Formula | Analysis | | M. P. or B. P. | Yield, Percent |
|---|---|---|---|---|---|
| | | Calcd. | Found | | |
| 11 | $C_{10}H_{14}ClNS_2$ | N 5.65<br>S 25.87<br>Cl 14.31 | 5.39<br>26.00<br>14.60 | 145–146° C./1 mm | 82.9 |
| 12 | $C_{11}H_{16}ClNS_2$ | N 5.35<br>S 24.49<br>Cl 13.54 | 5.50<br>24.42<br>12.94 | oil | 95.1 |
| 13 | $C_{14}H_{20}Cl_2N_2S_4$ | N 6.74<br>S 30.87<br>Cl 17.09 | 6.76<br>31.30<br>16.69 | 124–125° C | 97.0 |
| 14 | $C_{16}H_{24}Cl_2N_2S_4$ | N 6.32<br>S 28.91<br>Cl 15.99 | 6.33<br>28.88<br>15.44 | 102–103° C | 95.0 |

The products of this invention have a variety of uses such as intermediates, accelerators of vulcanization, fungicides, bacteriocides, antiseptics and herbicides. As illustrative of the accelerating activity rubber stocks were compounded comprising

| Stock | A | B | C |
|---|---|---|---|
| Smoked sheets parts by weight | 100 | 100 | 100 |
| Carbon black do | 50 | 50 | 50 |
| Zinc oxide do | 5 | 5 | 5 |
| Saturated hydrocarbon softener do | 3 | 3 | 3 |
| Stearic acid do | 2 | 2 | 2 |
| Antioxidant do | 1.5 | 1.5 | 1.5 |
| Sulfur do | 2.5 | 2.5 | 2.5 |
| 3-Chloro-2-butenyldimethyldithiocarbamate do | 0.8 | | |
| 2-Chloro allyl dimethyldithiocarbamate do | | 0.8 | |
| 3-Chloro-2-butenyldithiocarbamate do | | | 0.8 |

The stocks so compounded were vulcanized in the usual manner by heating in a press for 15 minutes at 330° F. The physical properties of the cured products are set forth below:

Table IV

| Stock | Modulus of Elasticity in lbs./in.² at Elongation of 500% | Ultimate Tensile, lbs./in.² | Ultimate Elongation, Percent |
|---|---|---|---|
| A | 2,100 | 2,190 | 515 |
| B | 2,120 | 2,155 | 515 |
| C | | 2,010 | 485 |

The new compounds also have the property of destroying vegetation and retarding plant growth. These properties are illustrated by tests which involve measuring the inhibition of the primary root growth of germinating seeds. A description of the test may be found in the Summary Tables of Biological Tests, vol. 4, #1, page 21, February 1952, published by the National Research Council. The percent root growth of cucumber and wheat seedlings after treatment with the test material at a concentration of 100 parts per million as compared to the untreated controls is given in the following table:

Table V

| Product | Percent Root Growth | |
|---|---|---|
| | Cucumber | Wheat |
| 3-Chloro-2-butenyl dimethyldithiocarbamate | 63 | 30 |
| 3-Chloro-2-butenyl diethyldithiocarbamate | 63 | 53 |
| 2-Chloroallyl diethyldithiocarbamate | 13 | 28 |
| 3-Chloro-2-butenyl-4-morpholinecarbodithioate | 81 | 96 |
| 2-Chloroallyl 4-morpholinecarbodithioate | 86 | 83 |
| 3-Chloroallyl 4-morpholinecarbondithioate | 37 | 34 |
| 3-Chloro-2-butenyl dithiocarbamate | 58 | 37 |
| 3-Chloroallyl dimethyldithiocarbamate | 27 | 35 |

2-chloroallyl diethyldithiocarbamate, it will be noted, is especially effective.

Foliage spray tests on bean and corn plants were carried out employing concentrations of 1% of 1. 3-chloro-2-butenyl dimethyldithiocarbamate
2. 3-chloro-2-butenyl diethyldithiocarbamate
3. 2-chloroallyl diethyldithiocarbamate
4. 3-chloroallyl 4-morpholinecarbodithioate
5. 3-chloro-2-butenyl dithiocarbamate
6. 3-chloroallyl dimethyldithiocarbamate
7. 3-chloroallyl diethyldicarbamate These compounds all destroyed the foliage of the test plants. In addition, compounds 1, 2, 3, 6 and 7 were active in pre-emergence tests when applied to plantings of cucumber, beet, radish and rye at the rate of 20 pounds per acre. Compounds 4 and 5 were active when applied at the rate of 50 pounds per acre.

It is intended to cover all changes and modifications of the examples of the invention herein chosen for purposes of disclosure which do not constitute departures from the spirit and scope of the invention.

What is claimed is:

1. A halogen substituted alkenyl ester of a dithiocarbamic acid in which the alkenyl group contains less than six carbon atoms and not more than one substituent of the group consisting of chlorine or bromine on any one carbon atom.

2. A compound of the structure R—S—R' where R is a thiocarbamyl radical and R' is a chloro substituted 2-alkenyl group containing less than six carbon atoms and having the chlorine linked to a double bonded carbon atom but not more than one chloro substituent on one carbon atom.

3. A compound of the structure R—S—R' where R is a thiocarbamyl radical and R' is a chloro substituted 2-alkenyl group containing less than six carbon atoms and one chloro substituent which is attached to a double bonded carbon atom.

4. A compound of the structure

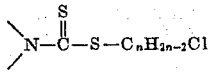

where $n$ is more than one but less than six, the chlorine is attached to an unsaturated carbon atom and the valences on the nitrogen atom are satisfied by a member of the class consisting of open and closed chain aliphatic radicals and divalent aliphatic radicals which with the nitrogen constitute a heterocyclic group.

5. A compound of the structure

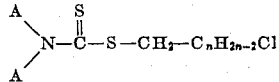

where A is an alkyl group containing less than nine carbon atoms and $n$ is an integer greater than one but less than four.

6. A compound of the structure

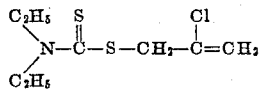

7. A compound of the structure

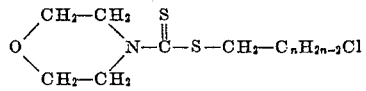

where $n$ is an integer greater than one but less than four.

8. A compound of the structure

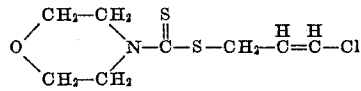

9. A compound of the structure

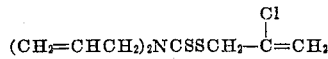

10. A compound of the structure

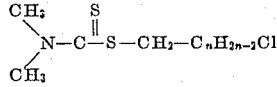

where $n$ is an integer greater than one but less than four.

11. A compound of the structure

$H_2NCSSCH_2CH=CClCH_3$

12. The method of making a halogen substituted alkenyl ester of a dithiocarbamic acid which comprises condensing an alkali metal salt of the dithiocarbamic acid with a poly halogen substituted olefin containing less than six carbon atoms in which the halogen substituents are selected from the group consisting of chlorine and bromine but not more than one halogen substituent is attached to any one carbon atom, thereby removing alkali metal halide.

13. The method of making a halogen substituted alkenyl ester of a dithiocarbamic acid which comprises condensing in aqueous solution an alkali metal salt of the dithiocarbamic acid with a polychloroolefin containing less than six carbon atoms and not more than one chloro substituent attached to any one carbon atom, thereby removing alkali metal chloride.

14. The method of making a halogen substituted alkenyl ester of a dithiocarbamic acid which comprises condensing in aqueous solution an alkali metal salt of the dithiocarbamic acid with a dichloromonoolefin containing less than six carbon atoms and having the chloro substituents attached to different carbon atoms, thereby removing alkali metal chloride.

15. The method of making a halogen substituted alkenyl ester of a dithiocarbamic acid which comprises condensing in aqueous solution an alkali metal salt of the dithiocarbamic acid with a dichloromonoolefin of the structure $Cl—CH_2—C_nH_{2n-2}Cl$ where $n$ is greater than one but less than four, thereby removing alkali metal chloride.

16. The method of making a halogen substituted alkenyl ester of a dithiocarbamic acid which comprises condensing in aqueous solution an alkali metal salt of a dialkyldithiocarbamic acid with a dichloromonoolefin of the structure $Cl—CH_2—C_nH_{2n-2}Cl$ where $n$ is greater than one but less than four, thereby removing alkali metal chloride.

17. The method of making a halogen substituted alkenyl ester of a dithiocarbamic acid which comprises condensing in aqueous solution sodium diethyldithiocarbamate with a dichloromonoolefin of the structure $Cl—CH_2—C_nH_{2n-2}Cl$ where $n$ is greater than one but less than four, thereby removing sodium chloride.

18. The method of making a halogen substituted alkenyl ester of a dithiocarbamic acid which comprises condensing in aqueous solution sodium dimethyldithiocarbamate with a dichloromonoolefin of the structure $Cl—CH_2—C_nH_{2n-2}Cl$ where $n$ is greater than one but less than four, thereby removing sodium chloride.

19. The method of making a halogen substituted alkenyl ester of a dithiocarbamic acid which comprises condensing in aqueous solution the sodium salt of morpholine carbodithioic acid with a dichloromonoolefin of the structure $Cl—CH_2—C_nH_{2n-2}Cl$ where $n$ is greater than one but less than four, thereby removing sodium chloride.

References Cited in the file of this patent
UNITED STATES PATENTS

| 2,097,155 | Groll et al. | Oct. 26, 1937 |
| 2,425,426 | Joyce | Aug. 12, 1947 |
| 2,579,384 | Handy et al. | Dec. 18, 1951 |